United States Patent
Geva et al.

(10) Patent No.: US 8,331,680 B2
(45) Date of Patent: Dec. 11, 2012

(54) METHOD OF GRAY-LEVEL OPTICAL SEGMENTATION AND ISOLATION USING INCREMENTAL CONNECTED COMPONENTS

(75) Inventors: Amir Geva, Yokneam (IL); Doron Tal, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1206 days.

(21) Appl. No.: 12/143,861

(22) Filed: Jun. 23, 2008

(65) Prior Publication Data

US 2009/0316991 A1 Dec. 24, 2009

(51) Int. Cl.
*G06K 9/18* (2006.01)
*G06K 9/34* (2006.01)

(52) U.S. Cl. ........................................ 382/182; 382/177

(58) Field of Classification Search .................. None
See application file for complete search history.

(56) References Cited

U.S. PATENT DOCUMENTS

| | | |
|---|---|---|
| 5,081,690 A | 1/1992 | Tan |
| 5,151,951 A | 9/1992 | Ueda et al. |
| 5,553,162 A | 9/1996 | Gaborski et al. |
| 5,818,978 A | 10/1998 | Al-Hussein |
| 6,157,738 A | 12/2000 | Wang |
| 6,798,895 B1 | 9/2004 | Takahashi |
| 2008/0310721 A1* | 12/2008 | Yang et al. ............ 382/182 |

FOREIGN PATENT DOCUMENTS

WO    WO02056255 A2    7/2002

OTHER PUBLICATIONS

Karl Tombre et al., "Text/Graphics Separation Revisited", (Source: http://www.loria.fr/~tombre/tombre-das02.pdf).
Premnath Dubeh, "Optical Character Recognition an Overview", (Source: http://www.tcllab.org/events/uploads/Anlp_Presentation.pdf).

* cited by examiner

*Primary Examiner* — Matthew Bella
*Assistant Examiner* — Fred Hu (57) ABSTRACT

A novel and useful method of using Incremental Connected Components to segment and isolate individual characters in a gray-scale or color image. For each pixel intensity of pixels in the image, a plurality of pixel groups are created comprising contiguous pixels of intensity equal to or less than the current pixel intensity. The pixel groups are then input to a character classifier which returns an identified character and a confidence value. Non-overlapping pixel groups (i.e. segmentation) of identified characters having the highest confidence values are then selected.

14 Claims, 6 Drawing Sheets

```
//NDA-Forest Insertion —112

Procedure MakeSet(X, index) —116
  X.parent = X
  X.index = index
  X.rank = 0
  X.neighbor[1:4] = NULL Procedure FindParent(X) —118
  If X != X.parent then
    X.parent Find(X.parent)
  end if
  return X.parent Procedure Union(X,Y) —120
  A = FindParent (X)
  B = FindParent (Y)
  if A !=B then
    X.neighbor[length(X.neighbor)+1] = Y
    Y.neighbor[length(Y.neighbor)+1] = X
    if A.rank>B.rank then  //Path compression
      B.parent = A
    else
      A.parent = B
    end if
    if A.rank = B.rank then  //Union by reank
      B.rank = B.rank+1
    end if
  end if //NDS-Forest Traversal —114

Procedure StartTraverse(X, threshold) —122
  Traverse(X, threshold,NULL)

Procedure Traverse(X, threshold, previousX) —124
  if X != NULL and X.index <= threshold then
    for k = 1 to length(X.neighbor) do
      if X.neighbor[k] != previousX then
        Traverse(X.neighbor[k], threshold,X)
      end if
    end for
  end if
```

METHOD OF GRAY-LEVEL OPTICAL SEGMENTATION AND ISOLATION USING INCREMENTAL CONNECTED COMPONENTS

FIELD OF THE INVENTION

The present invention relates to the field of optical character recognition, and more particularly relates to a method of gray level optical character segmentation and isolation using Incremental Connected Components.

SUMMARY OF THE INVENTION

There is thus provided in accordance with the invention, a method of isolating a character from a non binary image comprising a single character, the method comprising the steps of identifying the pixel intensity value of each pixel in said non-binary image, generating a pixel group comprising contiguous pixels of equivalent or lower pixel intensity values for each pixel intensity value found in said non-binary image, inputting said one or more generated pixel groups to a character classifier, wherein said character classifier returns an identified character and a confidence value and selecting said identified character with the highest confidence value.

There is also provided a accordance of the invention, a method of segmenting and isolating one or more characters from a non binary image comprising one or more characters, said method comprising the steps of identifying the pixel intensity value of each pixel in said non-binary image, generating one or more pixel groups comprising contiguous pixels of equivalent or lower pixel intensity values for each pixel intensity value found in said non-binary image, inputting plurality of said generated pixel groups to a character classifier, wherein for each input pixel group, said character classifier returns an identified character and a confidence value, identifying non overlapping input pixel groups with the highest confidence values; and selecting one or more identified characters associated with said identified non-overlapping pixel groups.

There is further provided a computer program product for isolating a character from a non binary image comprising a single character, the computer program product comprising a computer usable medium having computer usable code embodied therewith, the computer program product comprising computer usable code configured for identifying the pixel intensity value of each pixel in said non-binary image, computer usable code configured for generating a pixel group comprising contiguous pixels of equivalent or lower pixel intensity values for each pixel intensity value found in said non-binary image, computer usable code configured for inputting said one or more generated pixel groups to a character classifier, wherein said character classifier returns an identified character and a confidence value, and computer usable code configured for selecting said identified character with the highest confidence value.

There is also provided a computer program product for segmenting and isolating one or more characters from a non binary image comprising one or more characters, the computer program product comprising a computer usable medium having computer usable code embodied therewith, the computer program product comprising computer usable code configured for identifying the pixel intensity value of each pixel in said non-binary image, computer usable code configured for generating one or more pixel groups comprising contiguous pixels of equivalent or lower pixel intensity values for each pixel intensity value found in said non-binary image, computer usable code configured for inputting plurality of said generated pixel groups to a character classifier, wherein for each input pixel group, said character classifier returns an identified character and a confidence value, computer usable code configured for identifying non overlapping input pixel groups with the highest confidence values and computer usable code configured for selecting one or more identified characters associated with said identified non-overlapping pixel groups.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document:

| Term | Definition |
| --- | --- |
| ASIC | Application Specific Integrated Circuit |
| CD-ROM | Compact Disc Read Only Memory |
| CPU | Central Processing Unit |
| DSP | Digital Signal Processor |
| EEROM | Electrically Erasable Read Only Memory |
| EPROM | Erasable Programmable Read-Only Memory |
| FPGA | Field Programmable Gate Array |
| FTP | File Transfer Protocol |
| HTTP | Hyper-Text Transport Protocol |
| I/O | Input/Output |
| LAN | Local Area Network |
| NDS | N-tree Disjointed Set |
| NIC | Network Interface Card |
| RAM | Random Access Memory |
| RF | Radio Frequency |
| ROM | Read Only Memory |
| WAN | Wide Area Network |

The present invention is a method of using Incremental Connected Components to segment and isolate individual characters in a gray-scale or color image. For each pixel intensity of pixels in the image, a plurality of pixel groups are created comprising contiguous pixels of intensity equal to or less than the current pixel intensity. The pixel groups are then input to a character classifier which returns an identified character and a confidence value. Non-overlapping pixel groups (i.e. segmentation) of identified characters having the highest confidence values are then selected.

One example application of the invention is to facilitate the development of tools to segment and isolate characters in gray-scale or color images. Automated segmentation and character isolation of gray-scale or color images using Incremental Connected Components provides more efficient and optimal character recognition.

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
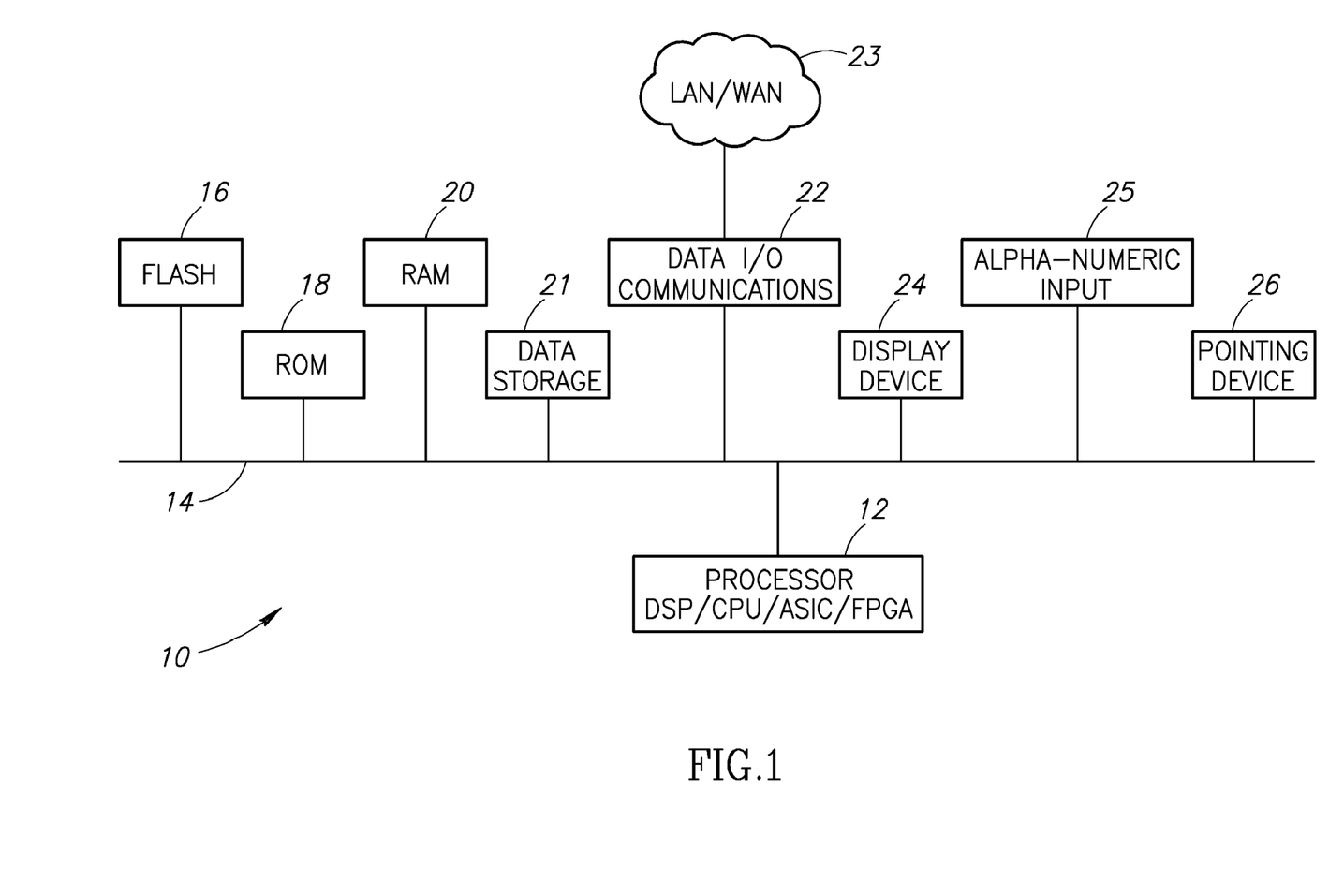
FIG. 1 is a block diagram illustrating an example computer processing system adapted to implement the gray level optical character segmentation and isolation method of the present invention.

A block diagram illustrating an example computer processing system adapted to implement the gray level optical character segmentation and isolation using Incremental Connected Components method of the present invention is shown in FIG. 1. The computer system, generally referenced 10, comprises a processor 12 which may comprise a digital signal processor (DSP), central processing unit (CPU), microcontroller, microprocessor, microcomputer, ASIC or FPGA core. The system also comprises static read only memory 18 and dynamic main memory 20 all in communication with the processor. The processor is also in communication, via bus 14, with a number of peripheral devices that are also included in the computer system. Peripheral devices coupled to the bus include a display device 24 (e.g., monitor), alpha-numeric input device 25 (e.g., keyboard) and pointing device 26 (e.g., mouse, tablet, etc.)

The computer system is connected to one or more external networks such as a LAN or WAN 23 via communication lines connected to the system via data I/O communications interface 22 (e.g., network interface card or NIC). The network adapters 22 coupled to the system enable the data processing system to become coupled to other data processing systems or remote printers or storage devices through intervening private or public networks. Modems, cable modem and Ethernet cards are just a few of the currently available types of network adapters. The system also comprises magnetic or semiconductor based storage device 52 for storing application programs and data. The system comprises computer readable storage medium that may include any suitable memory means, including but not limited to, magnetic storage, optical storage, semiconductor volatile or non-volatile memory, biological memory devices, or any other memory storage device.

Software adapted to implement the gray level optical character segmentation and isolation using Incremental Connected Components method of the present invention is adapted to reside on a computer readable medium, such as a magnetic disk within a disk drive unit. Alternatively, the computer readable medium may comprise a floppy disk, removable hard disk, Flash memory 16, EEROM based memory, bubble memory storage, ROM storage, distribution media, intermediate storage media, execution memory of a computer, and any other medium or device capable of storing for later reading by a computer a computer program implementing the method of this invention. The software adapted to implement the gray level optical character segmentation and isolation using Incremental Connected Components method of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the complex event processing system rule generation mechanism of the present invention, and to the extent that a particular system configuration is capable of implementing the system and methods of this invention, it is equivalent to the representative digital computer system of FIG. 1 and within the spirit and scope of this invention.

Once they are programmed to perform particular functions pursuant to instructions from program software that implements the system and methods of this invention, such digital computer systems in effect become special purpose computers particular to the method of this invention. The techniques necessary for this are well-known to those skilled in the art of computer systems.

It is noted that computer programs implementing the system and methods of this invention will commonly be distributed to users on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Gray Level Optical Character Segmentation and Isolation Using Incremental Connected Components In accordance with the invention, the Incremental Connected Components algorithm is implemented by sorting all the pixels in the image into "buckets" according to their intensity. Iterating over the intensities from dark to bright, the pixels are added to the appropriate bucket. For each such pixel, the surrounding pixels are examined, and if one exists that has the same or lower intensity, the new pixel is added to the existing component. Note that it is possible to prove that this algorithm can be implemented with a complexity of O(n) where n is the number of pixels in the image. Simple implementation resulting in slightly higher than O(n) can be done using an equivalence class algorithm.

For character recognition, the method of the present invention utilizes a character classifier that is based on a matrix comparison, as opposed to stroke features. The trained font for the classifier consists of representative images of each character. Since size and aspect ratio are not assumed to be 100% the same, the comparison is done after scaling the sample image to a given size. Therefore the selection of a bounding rectangle for the character has a major effect on the recognition result and confidence values.

Figure 2:
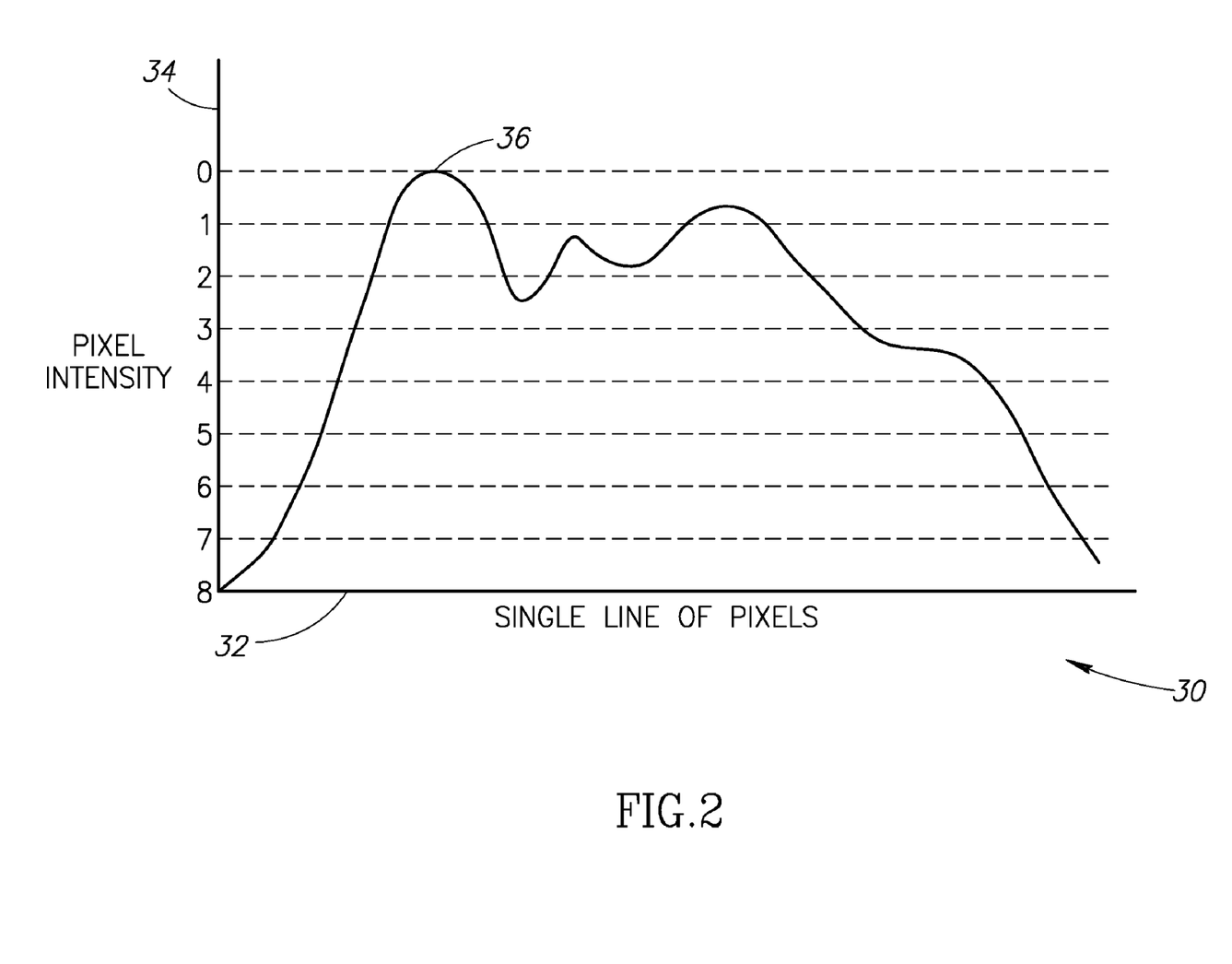
FIG. 2 is a chart graphing pixel intensity values of a single line of pixels illustrating an example of a portion of an image to be processed by the gray level optical character segmentation and isolation using Incremental Connected Components method of the present invention.

A chart showing pixel intensity levels for a single line of pixels (in an image) is shown in FIG. 2. The chart, generally referenced 30 comprises x-axis 32, y-axis and graph 34. In the chart the x-axis represents a single line of pixels from an image, the y-axis represents pixel intensity values (in this case 0-8), and the graph represents the pixel intensity for each pixel on the single line of pixels.

Following each iteration (i.e. of intensity level), collect all components comprising a bounding rectangle with dimensions that allow a text character to be contained (i.e. an appropriate aspect ratio). A character recognition algorithm is then executed which returns an identified character and a confidence value. The identified characters and their associated confidence values are then stored.

When all iterations are complete, the results of overlapping rectangles are reviewed and a pattern of a specific character being recognized with high confidence is identified. If necessary, this process is repeated over several iterations. A scoring scheme is used to identify the most probable characters and the final results are selected.

Figure 3:
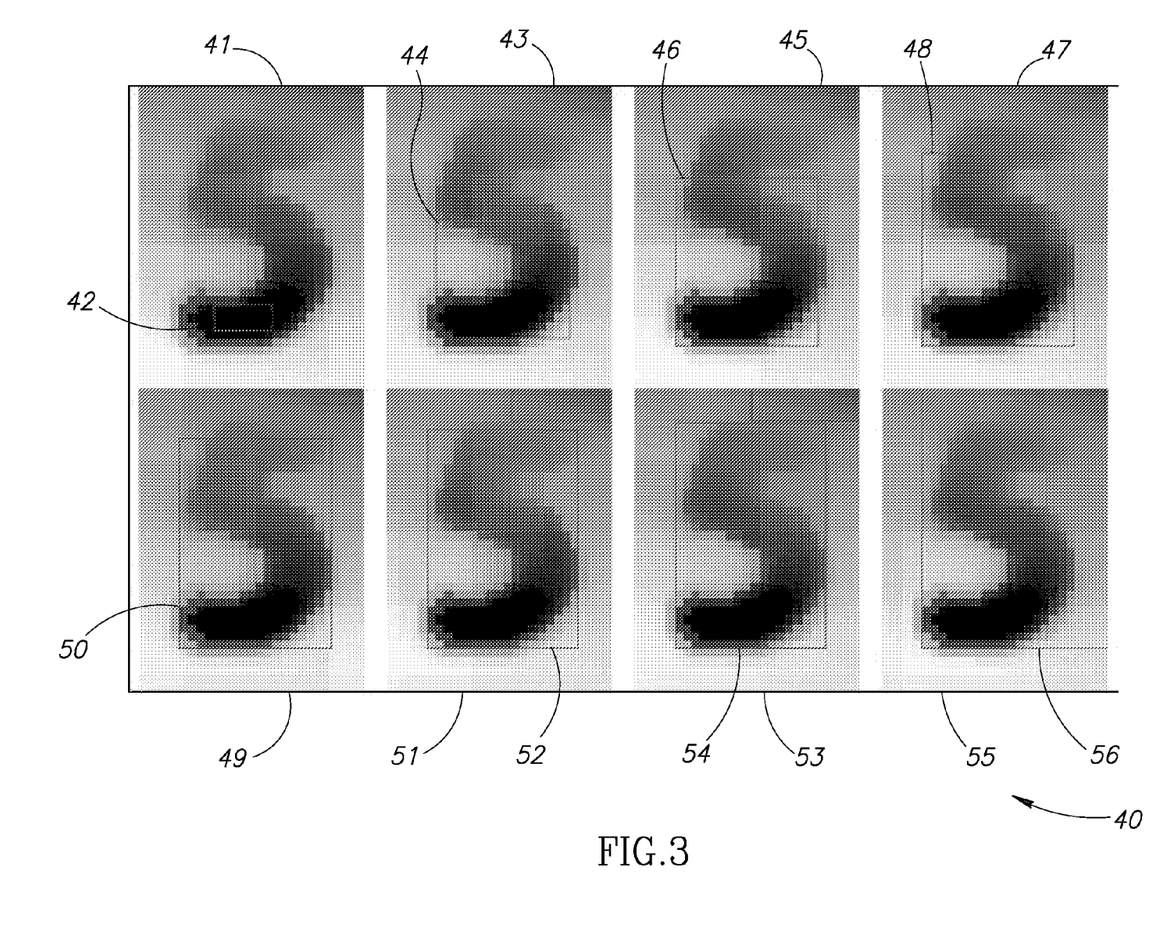
FIG. 3 is a series of scanned images representing the character isolation using Incremental Connected Components method of the present invention.

A series of scanned images illustrating the character isolation method of the present invention is shown in FIG. 3. The series of scanned images, generally referenced 40, comprises scanned images 41, 43, 45, 47, 49, 51, 53, 55 and bounded rectangles 42, 44, 46, 48, 50, 52, 56. Scanned images 41, 43, 45, 47, 49, 51, 53 and 55 are identical gray-scale photographs of the number five ("5"). Bounded rectangles 42, 44, 46, 48, 50, 52 and 56 illustrate the bounded rectangles that are created by the present invention as the pixel intensity threshold is raised (i.e. higher intensity meaning lighter shades of gray). Bounded rectangle 42 shows the bounded rectangle created for the lowest (i.e. darkest) pixel intensity and bounded rectangle 56 shows the bounded rectangle created for the highest (i.e. lightest) pixel intensity and includes all pixels of lower intensities. As higher pixel intensities are used to create the bounded rectangle, the region is slightly larger and therefore increasing the likelihood that a match is found.

Figure 4:
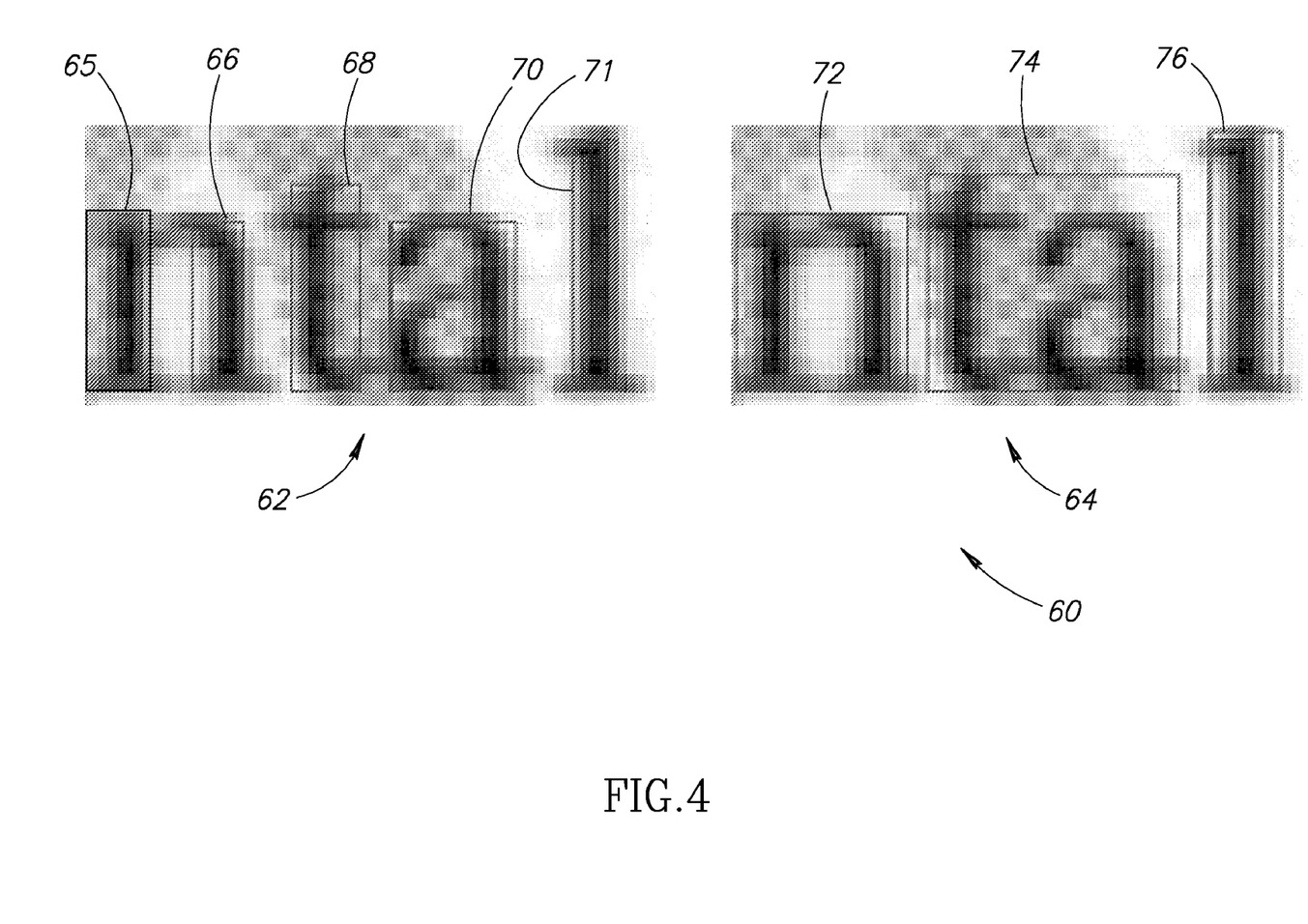
FIG. 4 is a series of scanned images representing the character segmentation using Incremental Connected Components method of the present invention.

A series of scanned images illustrating the segmentation method of the present invention is shown in FIG. 4. The series of scanned images, generally referenced 60, comprises scanned images 62 and 64. Scanned image 62 is further comprised of bounded rectangles 65, 66, 68, 70 an 71. Scanned image 64 is further comprised of bounded rectangles 72, 74 and 76. For the segmentation method of the present invention, components comprising bounding rectangles are collected during the increments (i.e. the pixel increment thresholds described supra), and logic is applied, along with feedback from the character classifier to determine the character segmentation.

In this example, bounded rectangles 65, 66, 68, 70 and 71 were defined using a lower (i.e. darker) pixel threshold than bounded rectangles 72 and 74. The pixel threshold used for scanned image 62 correctly segmented the letters "t" (68), "a" (70) and "l" (71), but did not correctly segment the letter "n" (65, 66). The pixel threshold used for scanned image 64 correctly segmented the letters "n" (72) and "l" (76), but incorrectly combined the letters "t" and "a" into a single segment (74). Bounded rectangle 74 would be rejected due to an invalid aspect ratio.

Figure 5:
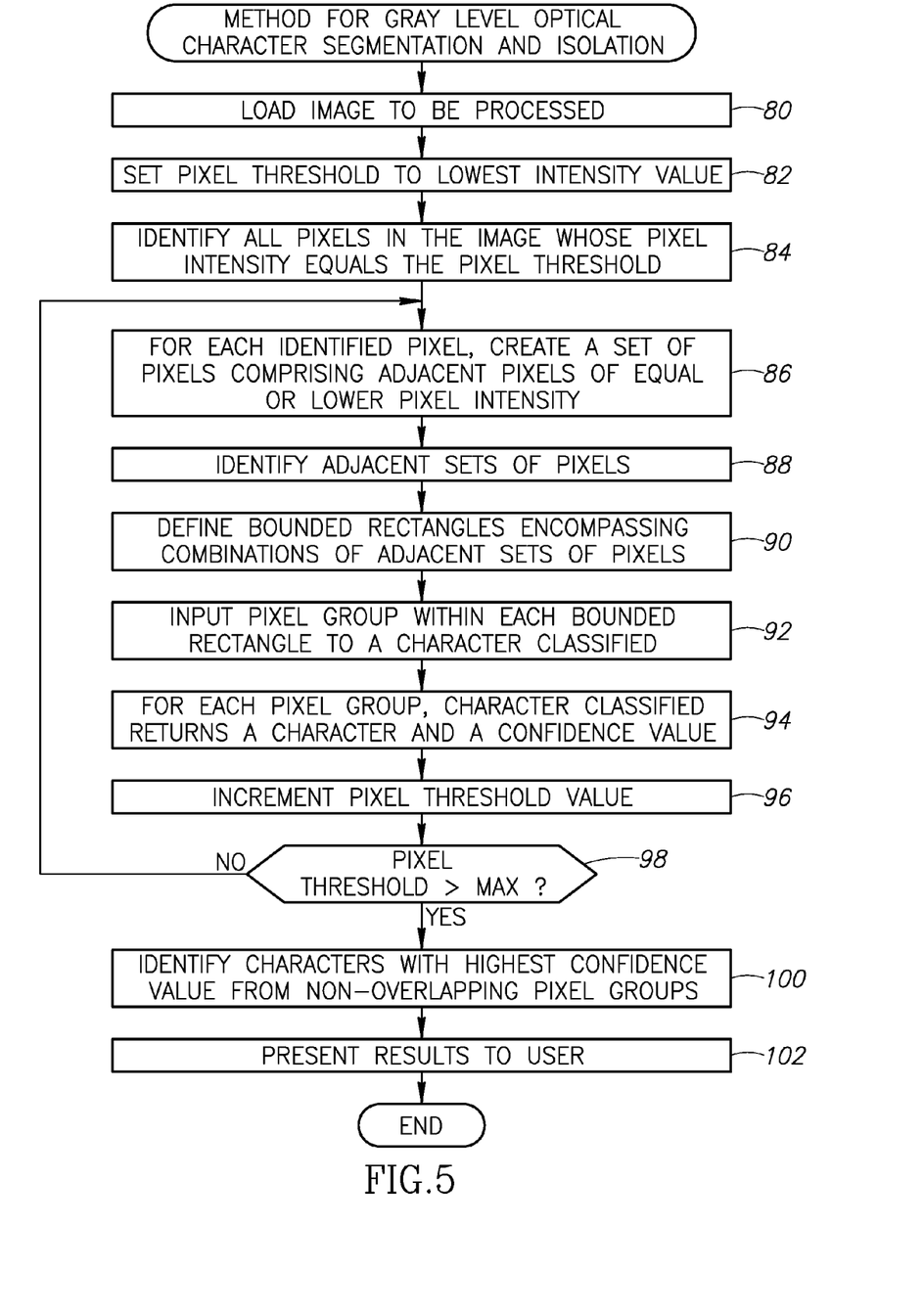
FIG. 5 is a flow diagram illustrating the gray level optical character segmentation and isolation using Incremental Connected Components method of the present invention.

A flow diagram illustrating the gray-level optical character segmentation and isolation method of the present invention is shown in FIG. 5. First the image to be processed is loaded (step 80). The pixel threshold is then set to the lowest intensity value (step 82) and all pixels in the image whose pixel intensity equals the pixel intensity value are identified (step 82). For each identified pixel, create a set of pixels comprising contiguous pixels of equal or lower pixel intensity (step 84). Adjacent sets of pixels are identified (step 88) and bounded rectangles are defined encompassing combinations of adjacent sets of pixels (step 90). The pixel groups from each bounded rectangle of pixels are then input to a character classifier (step 92) and the character classifier returns both an identified character and an associated confidence value for each pixel group (step 94). The pixel threshold value is then incremented (step 96). If the pixel threshold value is less than the maximum pixel threshold value (step 98) then the method of the present invention returns to step 84. If the pixel threshold value is greater than the maximum pixel threshold value then the iterations are complete (i.e. for processing the images). Characters are identified with the highest confidence values from non-overlapping pixel groups (step 100) and finally, the results are presented to the user (step 102).

Maximally Stable Regions plus N-tree Disjointed Set (NDS) Tree Algorithm

This algorithm utilized in one embodiment of the present invention is based on the article "N-tree Disjoint-Set Forests for Maximally Stable Extremal Regions" by Erik Murphy-Chutorian and Mohan Trivedi.

First all of the pixels in the image are sorted by intensity, which can be quickly accomplished in O(n) with the non-comparison based BinSort or CountingSort algorithms described in (1) Introduction to Algorithms, Thomas Cormen, Charles Leiserson, Ronald Rivest, and Clifford Stein, MIT Press and McGraw-Hill Book Co., second edition, 2001 and (2). Robust wide baseline stereo from maximally stable extremal regions, Jiŕi Matas, Ondrej Chum, Martin Urban, and Tom̀ as Pajdla. In Proc. British Machine Vision Conference, 2002.

After the pixels are sorted, the pixels are added in order to a list of connected components maintained by an NDS-forest data structure as follows:
Let X be the pixel to be added:
1. MakeSet(X, Intesity(X))
2. For each Neighbor Y of X which has already been inserted
   a. Union(X, Y).

By including the pixel position as an additional data member in each node, operations can be performed on any region such as estimating the center of gravity, fitting an ellipse, finding a convex hull, or simply recovering the pixel-level segmentation. To extract the connected component of intensity level less then TH and which pixel X belong to, the procedure StartTraverse(X, threshold) is called.

Figure 6:
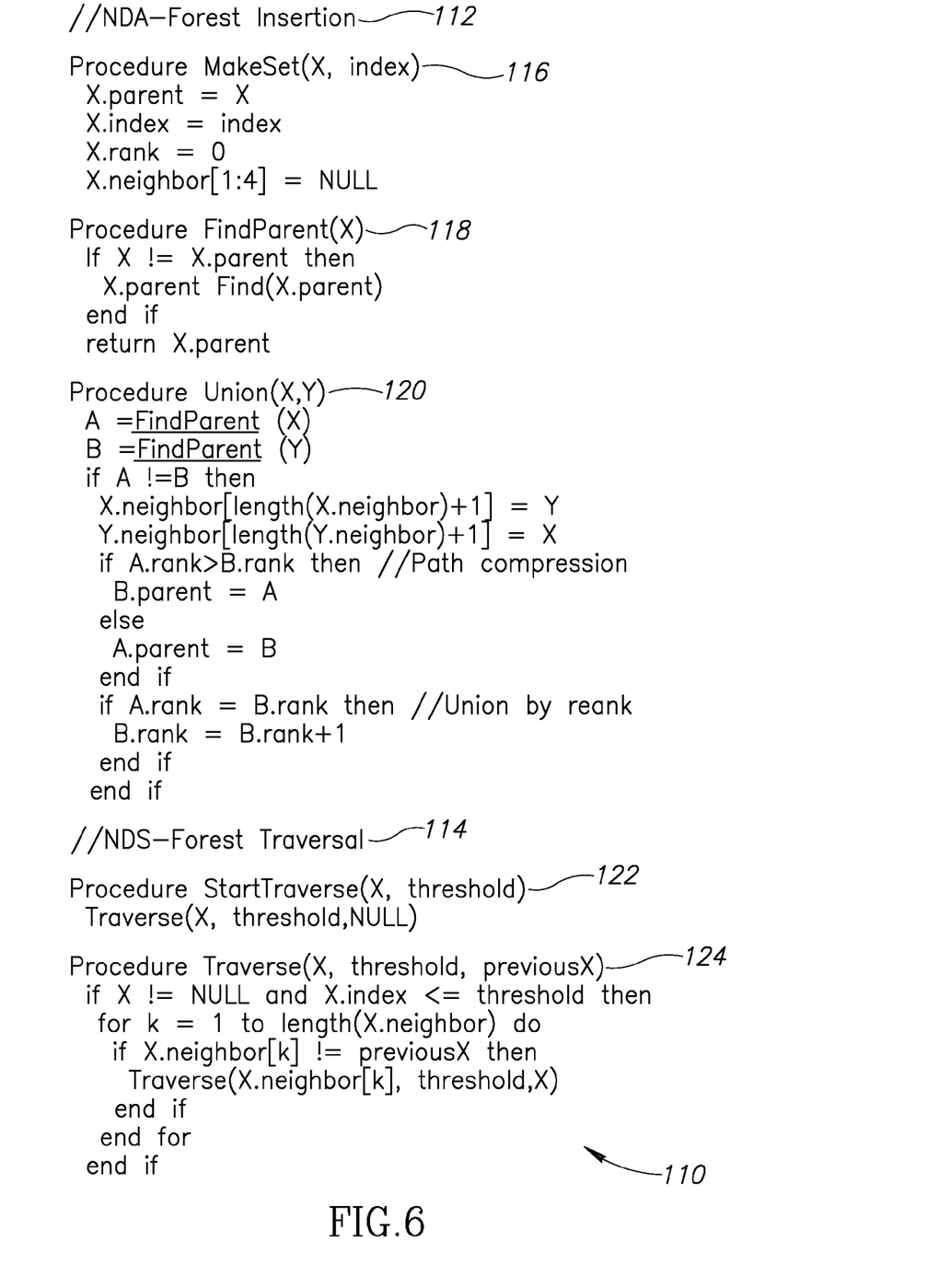
FIG. 6 is a pseudo-code source listing illustrating a sample implementation of the computer code to create pixel sets for the gray level optical character segmentation and isolation using Incremental Connected Components method of the present invention.

A pseudo-code listing showing a sample implementation of NDS-Forest Insertion and NDS-Forest traversal is shown in FIG. 6. The source listing, generally referenced 110 comprises sections NDS-Tree Insertion section 112 and NDS-Tree Traversal 114. NDS-Tree Insertion section 112 further comprises procedures MakeSet 116, FindParent 118 and Union 120. NDS-Tree Traversal section 114 further comprises procedures StartTraverse 122 and Traverse 124.

In section NDS-Forest Insertion, procedure MakeSet (parameter X is a pixel, and parameter index is the current pixel intensity) creates a new uninitialized set of pixels surrounding pixel X. Procedure FindParent (parameter X is a pixel) finds the parent of the set to which pixel X belongs. Procedure Union crates a union between the set associated with pixel X and the set associated with pixel Y. Rank and parent of the combined set is adjusted accordingly.

In section NDS-Forest Traversal, procedure StartTraverse calls procedure Traverse, passing parameters X (a pixel to start traversing from) and threshold (pixel intensity value). Procedure Traverse recursively traverses the set associated with parameters X and threshold, where X is any pixel in the set.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of segmenting and isolating one or more characters from a non-binary image comprising one or more characters, said method comprising the steps of:

identifying a pixel intensity value of each pixel in said non-binary image;

generating a plurality of pixel groups comprising contiguous pixels of equivalent or lower pixel intensity values for each pixel intensity value found in said non-binary image, each such pixel intensity value defining a threshold for a corresponding pixel group;

inputting the plurality of said generated pixel groups to a character classifier, wherein for each input pixel group, said character classifier returns an identified character and a confidence value;

identifying non-overlapping input pixel groups with the highest confidence values, the identified non-overlapping pixel groups having at least two different pixel thresholds; and selecting one or more identified characters associated with said identified non-overlapping pixel groups.

2. The method according to claim 1, wherein said non-binary image is a gray-scale or color image.

3. The method according to claim 1, wherein said pixel intensity is a numeric value representing a specific color.

4. The method according to claim 1, wherein said character classifier scales said generated pixel group to a specific size.

5. The method according to claim 4, wherein said pixel group scaled to a specific size enables a matrix comparison against defined characters in said character classifier.

6. The method according to claim 1, wherein said step of identifying non-overlapping input images with the highest confidence values segments said non-binary image into separate segments for each character.

7. The method according to claim 6, wherein each said segment comprises a bounding rectangle consisting of a two dimensional set of adjacent pixels.

8. A computer program product for segmenting and isolating one or more characters from a non-binary image comprising one or more characters, the computer program product comprising:

a non-transitory computer usable medium having computer usable code embodied therewith, the computer program product comprising:

computer usable code configured for identifying a pixel intensity value of each pixel in said non-binary image;

computer usable code configured for generating a plurality of pixel groups comprising contiguous pixels of equivalent or lower pixel intensity values for each pixel intensity value found in said non-binary image, each such pixel intensity value defining a threshold for a corresponding pixel group;

computer usable code configured for inputting the plurality of said generated pixel groups to a character classifier, wherein for each input pixel group, said character classifier returns an identified character and a confidence value;

computer usable code configured for identifying non overlapping input pixel groups with the highest confidence values, the identified non-overlapping pixel groups having at least two different pixel thresholds; and computer usable code configured for selecting one or more identified characters associated with said identified non-overlapping pixel groups.

9. The computer program product according to claim 8, wherein said non-binary image is a gray-scale or color image.

10. The computer program product according to claim 8, wherein said pixel intensity is a numeric value representing a specific color.

11. The computer program product according to claim 8, wherein said character classifier scales said generated pixel group to a specific size.

12. The computer program product according to claim 8, wherein said pixel group scaled to a specific size enables a matrix comparison against defined characters in said character classifier.

13. The computer program product according to claim 8, wherein said step of identifying non-overlapping input pixel groups with the highest confidence values segments said non-binary image into separate segments for each character.

14. The computer program product according to claim 13, wherein each said segment comprises a bounding rectangle consisting of a two dimensional set of adjacent pixels.

* * * * *